United States Patent [19]

Trouw

[11] Patent Number: 4,693,825
[45] Date of Patent: Sep. 15, 1987

[54] METHOD FOR THE PREPARATION OF POLYBENZIMIDAZOLE MEMBRANES

[75] Inventor: Norman S. Trouw, Gillette, N.J.

[73] Assignee: Celanese Corporation, New York, N.Y.

[21] Appl. No.: 779,017

[22] Filed: Sep. 23, 1985

[51] Int. Cl.$^4$ ................................................ C08J 9/28
[52] U.S. Cl. .................................. 210/500.28; 264/41
[58] Field of Search ...................... 264/41; 210/500.28

[56] References Cited

U.S. PATENT DOCUMENTS 3,720,607 3/1973 Brinegar ........................... 264/41 X
3,841,492 10/1974 Brinegar ........................... 264/41 X Primary Examiner—Philip Anderson
Attorney, Agent, or Firm—Lynch, Cox & Gilman

[57] ABSTRACT

This invention is an improved process for the preparation of polybenzimidazole membranes. When benzyl alcohol is added to a polybenzimidazole casting dope, polybenzimidazole membranes useful in reverse osmosis may be prepared without annealing the membrane.

17 Claims, No Drawings

METHOD FOR THE PREPARATION OF POLYBENZIMIDAZOLE MEMBRANES

BACKGROUND OF INVENTION

1. Field of Invention

This invention relates to a process for preparing membranes. More particularly, the invention relates to an improved process for the production of polybenzimidazole membranes which may be used, for example, in reverse osmosis.

2. Prior Art

Semipermeable membranes proposed in the past have been formed from a variety of materials, and are characterized by the ability to permit one component (e.g., ions or molecules) of a solution to pass through the membrane to the substantial exclusion of other components (e.g., other ions or molecules). Examples of substances heretofore recognized to possess this property include cellophane (i.e., regenerated cellulose), cellulose esters (e.g., cellulose acetate, cellulose butyrate, etc.), animal or protein membranes, polyelectrolyte complexes, ethyl cellulose, cross-linked polyacrylates, etc.

The semipermeable membranes of the prior art are of limited applicability in many separatory processes, such as reverse osmosis or ultrafiltration because of the inherent disadvantages relating to their chemical stability, strength, thermal stability, efficiency, length of life, and cost. Generally, the prior art membranes exhibit low thermal stability and, therefore, cannot be used successfully under conditions wherein the liquid undergoing treatment is at an elevated temperature. This may be a decided disadvantage in situations where the components to be separated only exist in solution at higher temperatures, or when it is economically advantageous to separate components of a solution at elevated temperatures rather than going to the expense of cooling it. Furthermore, some membranes exhibit a decided decrease in efficiency upon an increase in temperature or pressure thereby limiting their range of applicability. Solvent susceptibility may be another factor affecting the use of a particular porous membrane in a separation process. Additionally, semipermeable membranes may be inappropriate for a particular application due to low solute rejection values or low flux.

Other factors which render the semipermeable membranes of the prior art of limited usefulness in reverse osmosis separatory processes include their limited strength and chemical resistance and their extremely short operating lives at high pressures and temperatures.

The chemical resistance properties of the prior art separatory membranes have been their greatest shortcoming. Although the separation of solutions containing only sodium chloride and water presents few chemical resistance problems to the prior art membranes, such pure solutions are rarely found. Many naturally occurring saline solutions contain materials which exhibit a degrading effect on previously known reverse osmosis membranes. For example, cellulose acetate and amide-linked polymers, such as those disclosed in U.S. Pat. No. 3,567,632, are subject to either base or acid catalized hydrolysis even in weakly basic or acidic solutions. Other compounds which may exhibit a degrading effect on the prior art membranes include formic acid, acetone and bisulfite ions.

In an attempt to overcome certain of the above-noted disadvantages of prior art membranes, membranes comprised of polybenzimidazole polymers have been developed. See, for example, U.S. Pat. Nos. 3,699,038, 3,720,607, 3,737,042, 3,841,492, 3,851,025, 4,020,142, 4,448,687 and 4,512,894. In some instances, these membranes are fragile and contained voids in the membrane structure that reduced their strength.

U.S. Pat. Nos. 3,699,038, 3,737,042, 3,841,492, 3,851,025, 4,448,687, and 4,512,894 all disclose processes for the preparation of polybenzimidazole semipermeable membranes that include an annealing step. Usually the annealing step is added to the membrane preparation process to improve the mechanical properties of those membranes. However, the annealing step increases the cost and the time required to produce semipermeable membranes. In addition, although annealing enhances the salt rejection properties of membranes, it has the undesirable effect of decreasing the flux of the membrane.

U.S. Pat. No. 3,642,720 discloses the preparation of polybenzimidazole films without employing an annealing step. However, it does not disclose the preparation of membranes or the use of a non-solvent in the casting solution to enhance the mechanical properties of films.

Accordingly, it is an object of this invention to prepare polybenzimidazole membranes.

It is another object of this invention to prepare polybenzimidazole membranes without employing an annealing step.

It is also an object of this invention to prepare polybenzimidazole membranes which exhibit high flux and high salt rejection properties.

It is a further object of this invention to prepare polybenzimidazole membranes that are useful in reverse osmosis.

These and other objectives are obtained by employing the process of the instant invention.

SUMMARY OF INVENTION

The present invention constitutes an improved process for producing a semipermeable polybenzimidazole membrane which comprises the following steps:

(a) preparing a solvent solution of a polybenzimidazole polymer;

(b) adding a non-solvent to the polybenzimidazole solution;

(c) depositing a film of the non-solvent/solvent mixture upon a support;

(d) removing a portion of the solvent from the film sufficient to result in the formation of a thin solid layer on the exposed surface of the film, the layer having a density which is substantially greater than the remaining portion of the film on which the solid layer of increased density is formed; and (e) coagulating the polybenzimidazole film to form a semipermeable membrane.

The addition of a nonsolvent to the polybenzimidazole solution permits membranes to be prepared without an annealing step. These unannealed membranes may be used in reverse osmosis separatory processes.

DETAILED DESCRIPTION OF INVENTION

A. The Starting Material

The polymeric material used to form the semipermeable membranes of the present invention is a linear polybenzimidazole. Polybenzimidazoles are a known class of heterocyclic polymers. Typical polymers of this class and their preparation are more fully described in U.S. Pat. Nos. 2,895,948, Re. 26,065, and in the Journal of Polymer Science, Vol. 50, pages 511–539 (1961) which are herein incorporated by reference. The polybenzimidazoles consist essentially of recurring units of the following Formulas I and II. Formula I is:

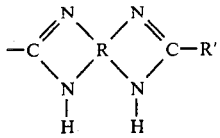

wherein R is a tetravalent aromatic nucleus, preferably symmetrically substituted, with the nitrogen atoms forming the benzimidazole rings being paired upon adjacent carbon atoms, i.e., ortho carbon atoms, of the aromatic nucleus, and R' is a member of the class consisting of (1) an aromatic ring, (2) an alkylene group (preferably those having 4 to 8 carbon atoms), and (3) a heterocyclic ring from the class consisting of (a) pyridine, (b) pyrazine, (c) furan, (d) quinoline, (e) thiophene, and (f) pyran.

Formula II is:

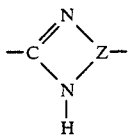

wherein Z is an aromatic nucleus having the nitrogen atoms forming the benzimidazole ring paired upon adjacent carbon atoms of the aromatic nucleus.

Preferably, aromatic polybenzimidazoles are selected from polymers consisting essentially of the recurring units of Formula I wherein R' is an aromatic ring or a heterocyclic ring and Formula II.

As set forth in U.S. Pat. No. Re. 26,065, the aromatic polybenzimidazoles having the recurring units of Formula II may be prepared by self-condensing a trifunctional aromatic compound containing only a single set of ortho disposed diamino substituents and an aromatic, preferably phenyl, carboxylate ester substituent. Exemplary of polymers of this type is poly-2,5(6)-benzimidazole prepared by the autocondensation of phenyl-3,4-diaminobenzoate.

As set forth in the above-mentioned patent, the aromatic polybenzimidazoles having the recurring units of Formula I may be prepared by condensing an aromatic tetraamine compound containing a pair of orthodiamino substituents on the aromatic nucleus with a dicarboxylic compound selected from the class consisting of (a) the diphenyl ester of an aromatic dicarboxylic acid, (b) the diphenyl ester of a heteroyclic dicarboxylic acid wherein the carboxyl groups are substituents upon a carbon in a ring compound selected from the class consisting of pyridine, pyrazine, furan, quinoline, thiophene and pyran and (c) an anhydride of an aromatic dicarboxylic acid.

Examples of polybenzimidazoles which have the recurring structure of Formula I are as follows:
poly-2,2'(m-phenylene)-5,5'-bibenzimidazole;
poly-2,2'-(pyridylene-3",5")-5,5'-bibenzimidazole;
poly-2,2'(furylene-2",5")-5,5'-bibenzimidazole;
poly-2,2'-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexeneyl-5,5'-bibenzimidazole;
poly-2,2'(m-phenylene)-5,5'-di(benzimidazole) ether;
poly-2,2'(m-phenylene)-5,5'-di(benzimidazole) sulfide;
poly-2,2'(m-phenylene)-5,5'-di(benzimidazole) sulfone;
poly-2,2'(m-phenylene)-5,5'-di(benzimidazole) methane;
poly-2',2"(m-phenylene)-5,5"-di(benzimidazole) propane-2,2;
and poly-2, 2-(m-phenylene)-5', 5"-di(benzimidazole) ethylene-1,2 where the double bonds of the ethylene groups are intact in the final polymer.

The preferred polybenzimidazole for use in the present process is one prepared from poly-2,2'-(m-phenylene)-5,5,'bibenzimidazole, the recurring unit of which is:

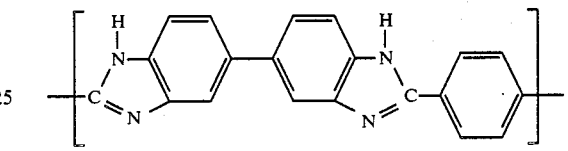

Any polymerization process known to those skilled in the art may be employed to prepare the polybenzimidazoles which may then be formed into a semipermeable membrane according to the process of this invention. Representative techniques for preparing the polybenzimidazole are disclosed in U.S. Pat. Nos. 3,509,108, 3,549,603, 3,551,389, 4,312,976, 4,452,971, 4,452,972, 4,483,977 and 4,485,232 which are herein incorporated by reference.

With respect to aromatic polybenzimidazoles, preferably equimolar quantities of the monomeric tetraamine and dicarboxyl compound are introduced into a first stage melt polymerization reaction zone and heated at a temperature above about 200° C., preferably at least about 250° C., and more preferably from about 270° C. to 300° C. The reaction is conducted in a substantially oxygen-free atmosphere, i.e., below about 20 ppm oxygen and preferably below about 8 ppm oxygen, until a foamed prepolymer is formed having an inherent viscosity, expressed as deciliters per gram, of at least 0.1 and preferably from about 0.13 to 0.3. The inherent viscosity (I.V.) as used herein is determined from a solution of 0.4 grams of the polymer in 100 ml. of 97 percent $H_2SO_4$ at 25° C.

After the conclusion of the first stage reaction, which normally takes at least 0.5 hour and preferably 1 to 3 hours, the foamed prepolymer is cooled and then powdered or pulverized in any convenient manner. The resulting prepolymer powder is then introduced into a second stage polymerization reaction zone wherein it is heated under substantially oxygen-free conditions, as described above, to yield a polybenzimidazole polymer product, desirably having an I.V., as measured above, of at least 0.4, e.g., 0.8 to 1.1 or more.

The temperature employed in the second stage is at least 250° C., preferably at Least 325° C., and more preferably from about 350° C. to 425° C. The second stage reaction generally takes at least 0.5 hour, and preferably from about 1 to 4 hours or more. It is, of course, also possible to prepare the instant polymers via a one-step reaction. However, the previously-described two-step process is preferred.

B. The Polymer Casting Solution

The solvents utilized to form the polybenzimidazole polymer casting solutions from which semipermeable membranes are cast include those solvents which are commonly recognized as being capable of dissolving the particular polybenzimidazole polymer. For instance, the solvents may be selected from those commonly utilized in the formation of polybenzimidazole dry spinning solutions. Illustrative examples of suitable solvents include N,N-dimethyl acetamide, N,N-dimethyl formamide, dimethyl sulfoxide, and N-methyl-2-pyrrolidone. The particularly preferred solvent is N,N-dimethyl acetamide. Additional representative solvents include formic acid, acetic acid, and sulfuric acid.

The polymer casting solutions may be prepared first by dissolving polybenzimidazole in a solvent. The amount of polybenzimidazole which is dissolved in the solvent should be enough so that the casting solution containing a polymer, a solvent and a non-solvent will contain from about 5 to 30 percent by weight of the polymer based on the total weight of the solution, and preferably from about 10 to 20 percent by weight, with about 15 percent being most preferred.

The quantity of polybenzimidazole dissolved in the solvent should be such that the casting solution has a viscosity of about 50 to 4,000 poise at 30° C., and preferably about 400 to 600 poise.

One suitable means for dissolving the polymer in the solvent is by mixing the materials at a temperature above the normal boiling point of the solvent, for example, about 25° C. to 120° C. above such boiling point, and at a pressure of 2 to 15 atmospheres for a period of 1 to 5 hours. The resulting solutions are preferably filtered to remove any undissolved polymer. A minor amount of lithium chloride optionally may be provided in the solution in accordance with the teachings of commonly-assigned U.S. Pat. No. 3,502,606. The lithium chloride serves to prevent the polybenzimidazole polymer from phasing out of the solution upon standing for extended periods of time.

Finally, benzyl alcohol is added to the polymeric casting solution. Generally, the benzyl alcohol is added at about the 5 to 35 percent by weight level, preferably the 10 to 25 percent by weight level, based upon the total weight of the polymeric solution. The maximum solubility of benzyl alcohol in the polymeric solution is about 35 percent by weight based upon the total weight of the polymeric solution containing the polymer, benzyl alcohol and the solvent. The amount of benzyl alcohol added will depend on the desired combination of the flux rate and the salt rejection rate. When benzyl alcohol is added at about its maximum solubility level (i.e. about 35 percent by weight), the highest combination of high flux, high salt rejection rates is obtained. Decreasing the amount of benzyl alcohol will decrease the flux and increase the salt rejection properties of the resulting membrane.

C. Semipermeable Flat Film Membrane Formation

A process for the formation of semipermeable membranes is disclosed in U.S. Pat. No. 4,512,894 which is hereby incorporated by reference.

The casting solution of polybenzimidazole polymer in the present process is deposited upon a support to form a wet film of the same. The nature of the support is not critical and may be selected from a variety of materials including ceramic, glass, or metallic plates (e.g., stainless steel). The support is preferably provided with retaining elements, or raised edges, whereby the solution is confined to the surface thereof at the desired location until its consistency is such that retaining elements are no longer needed. Numerous techniques are available for the application of the solution to the support as will be apparent to those skilled in the art. For instance, the polybenzimidazole polymer solution may be simply poured upon a level support in a quantity sufficient for it to assume the desired uniform thickness. A blade is then drawn over the surface of the wet film to aid the deposition of a wet film of uniform thickness.

The thickness of the wet film deposited upon the support is influenced by the desired thickness of the polybenzimidazole semipermeable membrane ultimately to be produced. Generally, the wet film is deposited upon the support in a substantially uniform thickness of about 0.5 to 30.0 mils and preferably 1.0 to 10.0 mils. In a particularly preferred embodiment of the invention, the wet film is deposited in a thickness of about 1.0 to 5.0 mils.

A quantity of solvent is next evaporated from the exposed surface of the wet film to allow the formation of a relatively thin solid layer (i.e., a thin porous polymeric film) on the exposed surface of the film. The thin solid layer commonly exhibits a thickness of about 0.01 to 20 microns and preferably about 1 to 10 microns. During the formation of the solid layer on the exposed surface of the film, the solvent present near the surface of the wet film is flashed off and a thin coagulated solid layer or skin of polybenzimidazole polymer remains.

The evaporation of solvent from the exposed surface of the wet film may be accomplished by a variety of techniques as will be apparent to those skilled in the art. For instance, a stream of air or other gas at ambient or at an elevated temperature (e.g. approaching the boiling point of the solvent) may simply be directed at the exposed surface of the wet film. Other methods of evaporation are listed in U.S. Pat. No. 4,512,894. The time required to form the desired thin solid layer upon the exposed surface of the wet film commonly ranges from about 5 seconds to 30 minutes, and preferably from about 15 seconds to 5 minutes. The temperature at which the solvent is removed is generally room temperature, although higher temperatures may also be employed.

The resulting film, bearing a thin solid layer upon its surface, is next converted to a semipermeable membrane by coagulating the film in a medium which is a non-solvent for the polybenzimidazole polymer and which is capable of removing residual quantities of the polybenzimidazole solvent. Preferably, the non-solvent is aqueous in nature and most preferably it is water. During the coagulating step, the remaining polybenzimidazole polymer within the wet film is coagulated while the solvent which originally dissolved the polymer is removed. The coagulating step is preferably carried out by immersing the film in the liquid medium. In a preferred embodiment, a water medium is provided at a relatively cool temperature, for example, at about 5° C. to 30° C., and at a temperature of about 10° C. to 25° C. in a particularly preferred embodiment. Satisfactory coagulation times commonly range from about 20 seconds to 20 minutes, and preferably from about 2 to 5 minutes.

The resulting flat film membrane formed of the polybenzimidazole consists of an outer, relatively thin, surface layer formed during the evaporation step adjacent to a relatively thick layer of a more porous structure. The membranes are characterized by high thermal stability and can withstand temperatures during use in excess of 125° C. Also, the membranes exhibit a high degree of chemical stability, and can continue to function in spite of contact with a wide variety of reagents and solvents. In addition, the polybenzimidazole membranes have high flux and salt rejection properties. The flux of the membranes is between 21 and 25 gfd, and the salt rejection rate is between 89 and 93 percent when measured at 400 psi. using a 0.2 percent salt solution.

By employing the process of the present invention, high flux, high salt rejection membranes may be produced. Without the annealing step of the prior art, reverse osmosis membranes can be produced inexpensively. As compared to annealed membranes, the unannealed membranes of the present invention have few or no voids in the membrane structure. Consequently, the mechanical strength of the membranes is enhanced.

The polybenzimidazole membranes of the present invention, once positioned upon a conventional porous support, such as a porous steel plate, may be utilized to separate components of a solution by a variety of techniques, such as reverse osmosis, electrodialysis or ultrafiltration. The polybenzimidazole membranes of the present invention are particularly suited for use in desalination operations utilizing reverse osmosis.

The following example is given as a specific illustration of the invention. It should be understood, however, that the invention is not limited to the specific details set forth in the example. In the following example all parts and percentages are by weight unless otherwise indicated.

EXAMPLE

A casting dope was prepared containing 15.0 percent by weight of a polybenzimidazole polymer (poly-2,2'-(m-phenylene)-5,5'-bibenzimidazole) having a inherent viscosity of 0.9, 2.0 percent by weight lithium chloride, 28.6 percent by weight benzyl alcohol and 54.4 percent by weight of dimethylacetamide. A 1.0 mil wet film was cast from the dope on a non-woven polyester fabric marketed by Eaton-Dikeman under the trademark Hollytex. The fabric was placed on a moving conveyor belt and a thin surface layer was formed on the wet film by heating the film to about 50° C. in an air convection oven wherein air was forced over the surface of the film at a rate of about 1200 feet per minute. The membrane was maintained on the conveyor belt in the oven for 30 seconds. The membrane was then coagulated for 16 minutes in water maintained at 10° C. and then rolled up and stored in water. The resulting membrane exhibited a film thickness of about 1.0 mils, a flux of 24.5 gfd., a salt rejection percent of 93.1 and a red dye passage rate of 0 to 0.2 ppm. The above rates were measured in an Osmonics, Inc. flow loop maintained at 25° C., and 400 psi, employing an aqueous solution containing 0.2 percent by weight sodium chloride, and 100 ppm Red Dye #40.

As can be seen from the above example, the addition of benzyl alcohol in the membrane casting solution permits high flux, high salt rejection membranes to be produced without an annealing step.

What is claimed is:

1. A process for the preparation of a semipermeable polybenzimidazole membrane comprising:
   (a) forming a solvent solution of a polybenzimidazole polymer;
   (b) adding benzyl alcohol to said solution;
   (c) depositing a film of polybenzimidazole upon a support;
   (d) removing sufficient solvent from said film to form a solid layer on the exposed surface of said film; and
   (e) coagulating said film with a coagulating non-solvent for said polymer to remove residual solvent and thereby to produce a semipermeable membrane.

2. The process of claim 1 wherein said polybenzimidazole polymer consists essentially of recurring units of the formula:

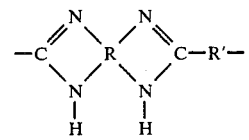

wherein R is a tetravalent aromatic nucleus with the nitrogen atoms forming the benzimidazole rings paired upon adjacent carbon atoms of said aromatic nucleus, and R' is selected from the group consisting of (1) an aromatic ring, (2) an alkylene group having from four to eight carbon atoms, and (3) a heterocyclic ring selected from the group consisting of (a) pyridine, (b) pyrazine, (c) furan, (d) quinoline, (e) thiophene, and (f) pyran.

3. The process of claim 1 wherein said polybenzimidazole polymer consists essentially of the recurring units of the formula:

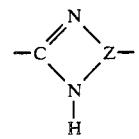

wherein Z is an aromatic nucleus having the nitrogen atoms forming the benzimidazole ring paired upon adjacent carbon atoms of the aromatic nucleus.

4. The process of claim 1 wherein said polybenzimidazole polymer is poly-2,2'-(m-phenylene)-5,5'-bibenzimidazole.

5. The process of claim 1 wherein said solvent for said polybenzimidazole polymer is selected from the group consisting of N,N-dimethylacetamide, N,N,-dimethyl formamide, dimethyl sulfoxide and N-methyl-2-pyrrolidone.

6. The process of claim 1 wherein said solvent is N,N-dimethylacetamide.

7. The process of claim 1 wherein after the addition of benzyl alcohol to said solution, said polybenzimidaoLe polymer is present in said solution in a concentration of about 5 to about 30 percent by weight based upon the total weight of said solution.

8. The process of claim 1 wherein benzyl alcohol is added to said solution in a concentration of about 5 to 35 percent by weight based upon the total weight of said solution.

9. The process of claim 1 wherein the benzyl alcohol is added to said solution in a concentration of about 10 to 25 percent by weight based on the total weight of said solution.

10. The process of claim 1 wherein said film is deposited on said support at a thickness of about 0.5 to 30.0 mils.

11. The process of claim 10 wherein said thickness is about 1.0 to 5.0 mils.

12. The process of claim 1 wherein said coagulating non-solvent is water.

13. The process of claim 12 wherein said water is employed at a temperature of about 5° to 30° C.

14. The process of claim 1 wherein after the addition of the benzyl alcohol to said solution, said polybenzimidazole polymer is present in said solution in a concentration of about 10 to 20 percent by weight based upon the total weight of said solution.

15. The semipermeable membrane produced in accordance with the process of claim 1.

16. In an improved process for the production of a semipermeable polybenzimidazole membrane wherein a solvent solution of a polybenzimidazole polymer is formed, a film of said solution is deposited upon a support, a portion of said solvent is removed to form a solid layer on the exposed surface of said film, and a semipermeable membrane is formed by coagulating said film in a coagulating non-solvent for said polymer, the improvement comprising adding benzyl alcohol to said solution of said polybenzimidazole polymer prior to depositing said solution upon a support.

17. A process for the production of a semipermeable polybenzimidazole membrane comprising:
   (a) forming a solvent solution of a polybenzimidazole polymer wherein said solvent is dimethylacetamide and said polymer is present in said solvent in a concentration of about 5 to 30 percent by weight based upon the total weight of said solution after the addition of benzyl alcohol;
   (b) adding benzyl alcohol to said solution and wherein said benzyl alcohol is present in said solution in a concentration of about 5 to 35 percent based upon the total weight of said solution;
   (c) depositing a film of said solution upon a support;
   (d) removing sufficient solvent from said film to result in the formation of a solid layer on the exposed surface of said film; and
   (e) coagulating with a coagulating non-solvent for said polymer to remove residual solvent and thereby producing a semipermeable membrane.

* * * * *